United States Patent [19]

Engelsdorf et al.

[11] Patent Number: 4,893,699
[45] Date of Patent: Jan. 16, 1990

[54] SHOCK ABSORBER

[75] Inventors: Kurt Engelsdorf, Besigheim; Karl-Heinz Hagele, Vaihingen/Enz; Bernd Taubitz, Schwieberdingen; Quang N. Tran, Stuttgart; Peter Zieher, Eberdingen, all of Fed. Rep. of Germany

[73] Assignee: Robert Bosch GmbH, Stuttgart, Fed. Rep. of Germany

[21] Appl. No.: 172,896

[22] Filed: Mar. 25, 1988

[30] Foreign Application Priority Data

Apr. 1, 1987 [DE] Fed. Rep. of Germany ....... 3710972
Jan. 14, 1988 [DE] Fed. Rep. of Germany ....... 3800864

[51] Int. Cl.$^4$ ............................................. F16F 9/35
[52] U.S. Cl. ................................... 188/299; 137/554; 137/625.33; 137/625.37; 188/319; 188/322.15; 251/129.15
[58] Field of Search .................... 188/299, 319, 322.13, 188/322.14, 322.15; 280/714; 251/902, 129.07, 129.15; 137/554, 625.33, 625.39

[56] References Cited

U.S. PATENT DOCUMENTS

| | | | |
|---|---|---|---|
| 2,642,254 | 6/1953 | Armstrong | 137/625.37 X |
| 3,147,827 | 9/1964 | Weisheit | 188/319 |
| 3,588,039 | 6/1971 | Chelminski et al. | 251/129.15 |
| 3,750,693 | 8/1973 | Hardison | 251/129.07 X |
| 4,198,030 | 4/1980 | Jackson et al. | 137/554 X |
| 4,471,810 | 9/1984 | Muchow et al. | 137/625.37 |
| 4,638,896 | 1/1987 | Poyser | 188/322.15 X |
| 4,723,640 | 2/1988 | Beck | 188/280 X |
| 4,726,453 | 2/1988 | Obstfelder et al. | 280/714 X |

FOREIGN PATENT DOCUMENTS 1095506 6/1955 France .
1363303 8/1974 United Kingdom ........... 188/322.14

Primary Examiner—George E. A. Halvosa
Attorney, Agent, or Firm—Edwin E. Greigg

[57] ABSTRACT

A shock absorber useful in motor vehicles which includes a piston inside of which an entire quantity of a damping fluid exchanged between two work chambers flows via a throttle cross section the size of which is defined by an electromagnetic adjusting device comprising primarily a magnet coil and an armature. The armature is annular and merges with an annular control slide provided with a slide control edge, which slide, in cooperation with a piston control edge on the piston determines the size of the throttle cross section. The control slide and armature are statically in pressure equilibrium, and because of their annular embodiment they have only a slight weight of their own, so that the shock absorber operates with short adjusting times. By way of a defined profile of the slide control edge or piston control edge, certain damping characteristics are attainable.

29 Claims, 3 Drawing Sheets

SHOCK ABSORBER

BACKGROUND OF THE INVENTION

The invention is directed to improvements in vehicle shock absorbers.

A shock absorber is already known in which the damping is variable by means of an electromagnetic adjusting device. The adjusting device is disposed on the damper piston. It includes a magnet coil, an armature and a control slide connected to the armature; the position of the control slide determines the throttling of the damping fluid that changes its location back and forth between the work chambers.

In the known embodiment, a compromise must be made between the maximum possible throttle cross section and the ability to effect fine control in the vicinity of small throttle cross sections.

Not all the circumference of the control slide is available for the control edge, and the throttling of the damping fluid takes place at two adjustable throttle restrictions connected in series with one another. Both factors dictate a relatively large slide and hence a relatively large, massive piston. The two series-connected throttle restrictions can be varied only in common with one another, by adjustment of the single control slide.

OBJECT AND SUMMARY OF THE INVENTION

The shock absorber equipped in accordance with the teaching herein contrarily, has the advantage of a small structural size and a high adjusting speed. The adjustable damping values have a very wide range.

The provisions recited herein disclose advantageous further features of and improvements of the shock absorber. It is particularly advantageous to provide the control slide, or a piston component that cooperates with the control slide, with a predetermined control profile.

The control profile can be embodied virtually arbitrarily, within wide limits. This makes it possible to attain virtually any desired slide stroke and damping force characteristic. In particular, a usually particularly advantageous linear dependency of the damper force on the stroke of the slide is thereby attainable.

On the one hand, the control profile on the control slide and/or on the piston enables very sensitive control of the damping force; on the other, a very large throttle cross section can be provided, despite relatively small component dimensions.

The aforementioned provisions reduce the forces originating in the flowing damping fluid to a minimum.

Because of the low mass of the slide, the short stroke, and the small forces involved, a high adjustment speed is attained, or else only small and inexpensive adjusting magnets are needed.

By means of the transducer recited herein along with an electronic control-unit, it is assured that the throttle cross section will attain its intended value, regardless of possible frictional forces between the armature and the piston rod, or flow forces, or electrical and magnetic losses.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
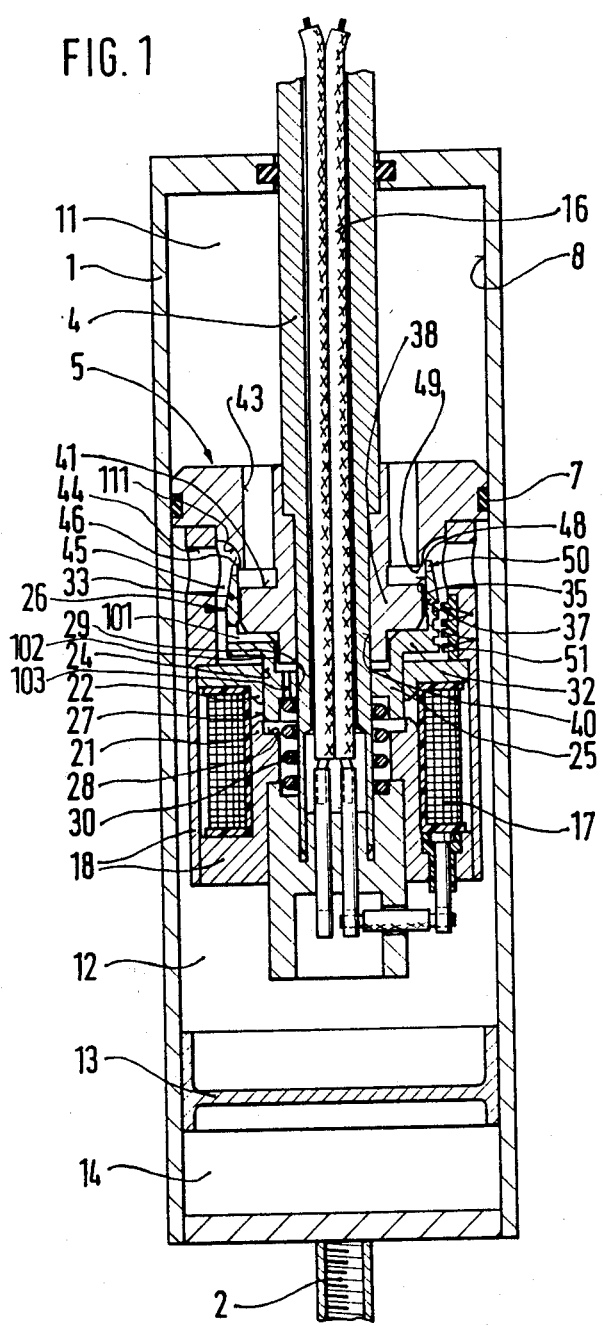
FIG. 1 shows a first exemplary embodiment of a shock absorber.

The shock absorber shown in FIG. 1 has a cylindrical jacket tube 1, which is secured with one face end to a vehicle axle 2. Protruding from the other face end of the jacket tube 1 is a piston rod 4, which is secured to a vehicle body, not shown. On its other end, the piston rod 4 is joined to a cylindrical piston 5, which via an interposed seal 7 can slide axially on an inner jacket face 8 of the jacket tube 1.

The interior of the jacket tube 1 is divided by the piston 5 into a first work chamber 11 and a second work chamber 12. Inside the jacket tube 1, a gas-filled compensation chamber 14 is also partitioned off by a movable partition 13. This chamber 14 serves to compensate for the increase or decrease in volume of the work chambers 11 and 12 that is due to the volume of the piston rod 4 withdrawn from or introduced into these chambers.

The piston rod 4 is hollow and receives an electric supply line 16, which is connected to a magnet coil 17 located coaxially inside the piston. The magnet coil 17 is located inside a coil housing 18 forming part of the piston 5 which terminates on the inside of the magnet coil 17 in the form of an annular first pole 21. A second, also annular pole 22, which is connected to the coil housing 18, extends axially, maintaining a certain spacing distance, toward the first pole 21. The two poles 21, 22 are provided with a coaxial bore 24, into which a portion, serving as an armature 25, of a sheath-like slide 26 protrudes at least partway. Depending on the axial position of the armature 25 in the bore 24, the armature 25 axially coincides with not only the second pole 22 but the first pole 21 as well. The magnet air gaps that are definitive for the magnetic force upon the armature 25 are located between a cylindrical outer jacket 27 of the armature 25 and the bore 24 forming the radial pole faces of the poles 21, 22, as well as between an axial step 28, recessed in the manner of a blind bore, of the first pole 21 and an end face, oriented toward the step 28, of the armature 25.

Located in the slide 26 is an axial through bore 29, by means of which the slide 26 is displaceable in an axially sliding manner on the piston rod 4. By means of a compression spring 30 surrounding the piston rod 4, the slide 26 is subjected to a force that urges the slide 26 away from the first pole 21. Correspondingly, upon electrical excitation of the magnet coil 17, the armature 25 and hence the slide 26 are moved counter to the force of the compression spring 30 in the direction of greater coincidence between the cylindrical outer jacket 27 of the armature 25 and the first pole 21.

Remote from the compression spring 30, the armature 25 merges, via an enlargement in the form of an annular disk 32, with a sheath-like control slide 33, the diameter of the control slide 33 being greater than the diameter of the armature 25. The control slide 33 can either be an integral part, along with the armature 25, of a component, that is, the slide 26, as shown in FIG. 1, or it can comprise two components that are joined together.

The sheath-like control slide 33 can slide with a finely machined inner jacket face 35 on a likewise finely machined outer jacket face 37 of a cylinder 38 forming part of the piston 5. The cylinder 38 is provided with a central bore 40, through which the piston rod 4 protrudes. The piston rod 4 and the cylinder 38 are firmly connected to one another.

An encompassing annular groove 41 is machined into the outer jacket face 37 of the cylinder 38. One or more axially eccentric recesses 43 provide a flow connection between the annular groove 41 and the first work chamber 11. At least one flow opening 44 is machined into the coil housing 18 radially about the annular groove 41 and outside the control slide 33; this flow opening furnishes a flow connection between a control chamber 45, receiving the slide 26, and the second work chamber 12.

The length of the slide 26 is dimensioned such that depending on the axial position of the slide 26, the control slide 33 coincides to a variable extent with the annular groove 41 in the axial direction. Located on the control slide 33, remote from the magnet coil 17, is a face end 46. The edge between the inner jacket face 35 and the face end 46 of the slide 26 is embodied as a slide control edge 48, which in cooperation with a piston control edge 49 defining the annular groove 41 determines the size of a throttle cross section 50, by way of which all the damping fluid that is exchanged between the work chambers 11 and 12 flows. The piston control edge 49 is a fixed edge relative to the piston. The damping fluid is throttled only once.

A transducer 51 is secured to the coil housing 18 in the vicinity of the slide 26, serving to detect the position of the slide 26 relative to the piston 5. The transducer 51, which for example measures inductively or capacitively, emits a measurement signal to an electronic control unit, which via a set-point/actual-value comparison operator generates a position signal that is delivered to the magnet coil 17. A control loop is thus formed, and the slide 26 can be positioned much more accurately, and with less dependency on tolerances, than without feedback of the actual position of the slide 26.

The slide control edge 48 and/or the piston control edge 49 can be provided with a profile having axially extending protrusions and indentations.

Figure 2:
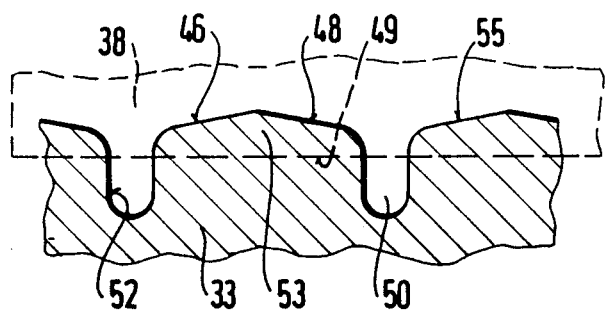
FIGS. 2 and 3 each show a modification of the control edge of the control slide of FIG. 1.

FIG. 2 shows an example of a possible course of the slide control edge 48 and the piston control edge 49 in a shock absorber as shown in FIG. 1. In this figure and in all the others, identical elements are identified by the same reference numerals as in FIG. 1. While the piston control edge 49 defining the annular groove 41 extends rectilinearly, the profile of the slide control edge 48 of the control slide 33 is a toothed profile, in which the indentations are embodied like tooth gaps 52 and the protrusions are embodied like teeth 53.

The more the slide 26 is attracted, upon excitation of the magnet coil 17, the farther the control slide 33 is deflected and the more widely the throttle cross section 50 is opened.

With relatively slight deflection of the control slide 33, the throttle cross section 50 is formed only by the tooth caps 52, while the teeth 53 still keep the piston control edge 49 of the cylinder 38 covered for the most part. With relatively great deflection of the control slide 33, the slide control edge 48 is lifted away from the piston control edge 49 in the vicinity of the teeth 53 as well. The throttle cross section 50 then extends without interruption over the entire circumference of the cylinder 38. Applying this to the damping force of the shock absorber, the damping is relatively major if the throttle cross sections 50 are formed only by the tooth gaps 52, and it decreases with increasing excitation of the magnet coil. The profile of the slide control edge 48 and the piston control edge 49 can be embodied so as to produce a dependency of the damping force on the stroke of the slide 26 that is variable within wide limits.

In the exemplary embodiment shown in FIG. 2, the slide 26 is designed such that in the normal operating position, a portion of obliquely extending flanks 55 of the teeth 53 just coincides with the cylinder 38. In this operating position, there is an infinitely variable, linear dependency of the damping force on the stroke of the slide 26.

The control slide 33 is embodied such that if the control slide 33 is not deflected, the tooth gaps 52 remain more or less open.

Should the triggering of the magnet coil 17 fail, the shock absorber operates with the maximum possible damping.

Figure 3:
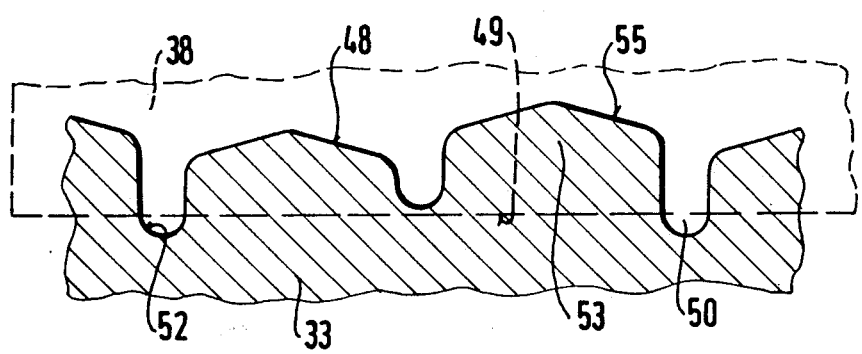

FIG. 3, like FIG. 2, shows a possible course of the slide control edge 48. In FIG. 3, however, the axial extension of he protrusions and indentations varies. Once again, the protrusions are embodied here like teeth 53 and the indentations like tooth gaps 52. The varying axial depth of the tooth gaps 52 provides a further structural improvement and increases the operational reliability, because when the control slide 33 is undeflected or only slightly deflected, or in other words during major damping, some of the tooth gaps 52 are covered by the cylinder 38. Thus, the tooth gaps 52 that are not covered can be made wider, with the same damping force. Tolerances become less of a factor, and there is less vulnerability to soiling. With increasing deflection of the control slide 33, that is, with an increasing throttle cross section 50, contrarily, it is favorable for the throttle cross section 50 not to be formed by too small a number of tooth gaps 52, so that possibly variably large radial components of flow forces at individual tooth gaps 52 can be mutually better compensated for.

The following embodiment, described for the sake of example, of the slide 26, the control chamber 45 and the piston control edge 49 produces particularly small axial flow forces at the slide 26. The pressure in the control chamber 45 can act on all sides on the slide 26, via a radial relief connection 101, a first axial relief connection 102 and a second axial relief connection 103. Additional relief connections are conceivable, but are not essential to the invention. The slide 26 is thus at a pressure equilibrium, in the static situation. However, if fluid is flowing from the control chamber 45 into the annular groove 41 or conversely from the annular groove 41 into the control chamber 45, then it is at its highest flow velocity in the vicinity of the slide control edge 48, and consequently the head (velocity pressure; dynamic pressure) is the greatest there. Because of the condition that the sum of static pressure and dynamic pressure is constant, not taking losses into account, the static pressure is lower in the vicinity of the slide control edge 48 and hence upon the end face 46 than in the remainder of the slide 26. The result is an axial force upon the slide 26 in the closing direction. This force is all the slighter, the narrower the end face 46 of the control slide 33.

Figure 4:
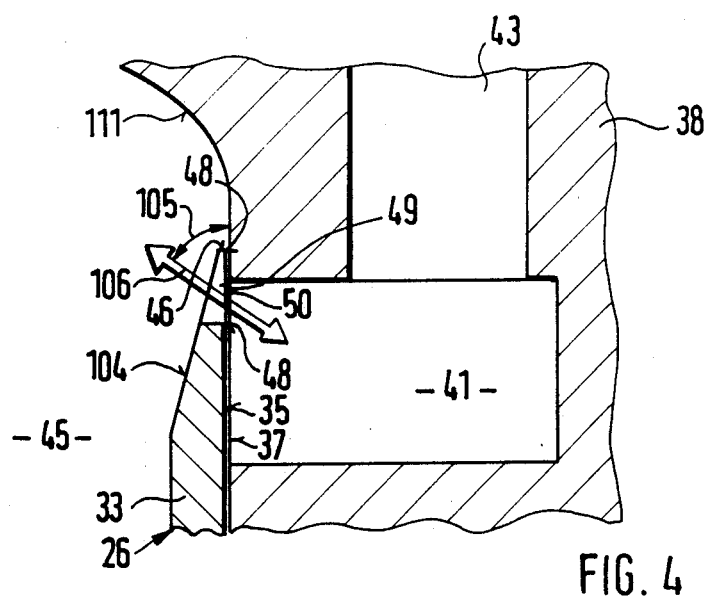
FIG. 4 is a detail of a portion of FIG. 1.

FIG. 4 shows a detail of FIG. 1 with the annular groove 41 and one end of the slide 26, on which the control slide 33 having the slide control edge 48 is located.

Figure 5:
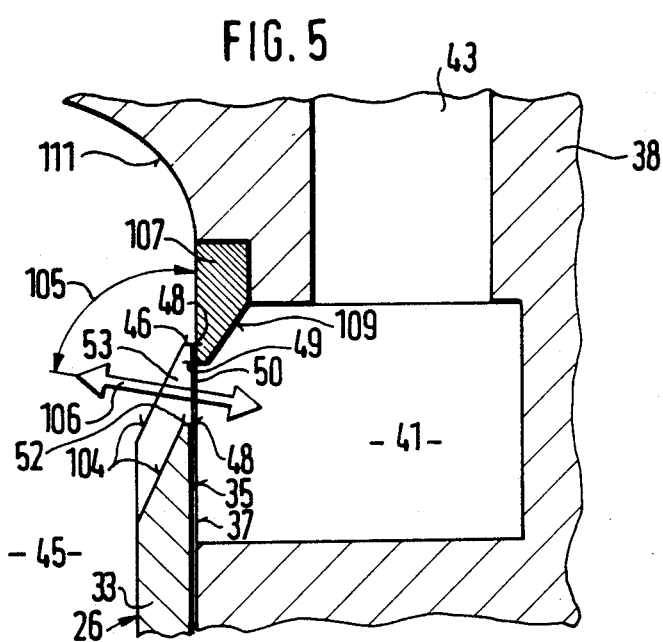
FIG. 5 shows the same detail as FIG. 4, with somewhat modified control edges.

FIG. 5 shows the same detail of FIG. 1 as FIG. 4, but in a somewhat modified version.

In the examples of FIGS. 4 and 5, an incline 104 is provided on the control slide 33 in such a way that the control slide 33 tapers like a knife edge on the end oriented toward the slide control edge 48. The result is a very narrow face end 46. For the sake of strength, it is favorable to leave a minimum width, as shown, on the face end 46.

In FIG. 4 the incline 104 forms an encompassing cone. In FIG. 5, the incline 104 is embodied such that the face end 46 in the tooth gap 52 is approximately as narrow as on the tooth 53.

Besides the force described first above, there are others, which will also be explained now, again referring to FIGS. 4 and 5.

In FIGS. 4 and 5, reference numeral 105 indicates the angle between the flow direction 106 of the fluid through the throttle cross section 50 and the actuation direction of the slide 26.

If the angle 105 is smaller than 90°, then a further axial force acts upon the slide 26. The closer the angle 105 is to 90°, the smaller is this axial force. This angle 105 is determined in a known manner by the radial play between the inner jacket face 35 of the control slide 33 and the outer jacket face 37 of the cylinder 38, by the shape of the slide control edge 48 and piston control edge 49, and by the axial spacing between the two control edges, but is also determined by the embodiment of the chamber from which the fluid flows into the throttle cross section 50, or into which the fluid flows. In the exemplary embodiment of FIG. 4, these chambers are embodied such that the angle 105 is relatively close to 90°. This is attained, first, by means of the incline 104 on the control slide 33 as already described above, and second by means of a maximally great axial spacing between the slide control edge 48 and the piston control edge 49. Even if the damping is set to be very strong, this maximally great axial spacing is produced because of the already described profiling of the slide control edge 48 and/or piston control edge 49, which in every case has a favorable effect, because the profiling causes a portion of the control edges to be covered, so that only some gaps remain for the throttle cross section.

In the exemplary embodiment of FIG. 5, a further reduction of the forces acting upon the slide 26 is obtained. By embodying a corner part 107, forming the piston control edge 49, of the annular groove 41 as a knife edge, which is attained by providing an incline 109, the oncoming flow angle 105 is still somewhat further improved toward 90°.

The corner part 107 and the cylinder 38 may comprise different parts, as shown in FIG. 5, or one part, not shown.

The reduction of the axial forces upon the slide 26 shown here is still further improved by providing that because of the profiles on the slide control edge 48 and/or piston control edge 49, with stronger damping, these forces act upon the control slide circumference only at portions thereof.

The above-described forces all act in the direction of decreasing throttle cross section. These forces can be compensated for at least in part by a force that is produced by a favorable embodiment of the control chamber 45, as described below.

The control chamber 45 is defined, opposite the face end 46 of the slide 26, by a deflection 111. This deflection 111 may for example be embodied as a rounded portion. By means of this deflection 111, the fluid flowing radially out of the at least one flow opening 44 into the control chamber 45 is at least partly deflected into the axial direction. This causes the fluid to flow against the face end 46 of the slide 26. The result is a force that urges the throttle cross section 50 open. The direction of this force is opposite that of the forces described above and hence at least partly compensates for them.

The slide 26 is rotationally symmetrical. As a result, the radially acting components of the forces acting upon the slide 26 are compensated for inside the slide.

It is especially advantageous for the control slide 33 to have a short armature stroke; therefore, large throttle cross sections are feasible. The diameter of the control slide 33 should suitably be markedly greater than the diameter of the piston rod 4.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A shock absorber particularly for vehicles, which comprises a jacket tube, a cylinder formed by said jacket tube, a piston guided in said cylinder inside said jacket tube, a piston rod secured to said piston, said piston dividing said cylinder into two work chambers, at least one flow connection between said two work chambers by way of which at least a portion of a damping fluid flows back and forth between said two work chambers, an electromagnetic adjusting device including a magnetic coil and an armature confined within said piston, a control slide connected to said armature, said control slide including a first control edge having a plurality of graduated axially extending protrusions and indentations which at any time determine a throttling of a damping fluid inside said at least one flow connection via a plurality of throttling openings, and said control slide (33) is embodied as narrow ian a radial direction on one face end (46) which forms said slide control edge (48).

2. A shock absorber as defined by claim 1, in which said control slide (33) tapers in knife-edge-like fashion on the end oriented toward said first control edge (48).

3. A shock absorber as defined by claim 2, which includes an annular groove corner part (107), on which a second edge (49) that is fixed relative to said piston (5) is located and which with at least said first control edge (48) forms a throttle cross section, and said corner part tapers in knife-edge-like fashion toward the second edge (49).

4. A shock absorber as defined by claim 3, in which said second edge (49) that is fixed relative to the piston (5) has a profile having at least one protrusion and indentation extending in an actuation direction of said control slide.

5. A shock absorber as defined by claim 4, in which an extension of said individual indentations on said second edge varies in an actuation direction of said control slide.

6. A shock absorber as defined by claim 2, which includes a second edge (49) that is fixed relative to the piston (5) has a profile having at least one protrusion and indentation extending in an actuation direction of said control slide.

7. A shock absorber as defined by claim 6, in which an extension of said individual protrusions on said second edge varies in an actuation direction of said control slide.

8. A shock absorber as defined by claim 6, in which at least one protrusion of at least one edge has the form of a tooth (53) and at least one indentation has the form of a tooth gap (52).

9. A shock absorber as defined by claim 2, in which a throttle cross section in at least some of the possible positions of the control slide is composed of a plurality of individual throttle cross section surfaces.

10. A shock absorber as defined by claim 1, which includes an annular groove corner part (107), on which a second edge (49) that is fixed relative to said piston (5) is located and which with at least said first control edge (48) forms a throttle cross section, and said corner part tapers in knife-edge-like fashion toward the second edge (49).

11. A shock absorber as defined by claim 10, in which said second edge (49) that is fixed relative to the piston (5) has a profile having at least one protrusion and indentation extending in an actuation direction of said control slide.

12. A shock absorber as defined by claim 11, in which an extension of said individual indentations on said second edge varies in an actuation direction of said control slide.

13. A shock absorber as defined by claim 10, in which said second edge (49) is fixed relative to said piston and determines a throttle cross section which extends uninterruptedly in at least some positions of said control slide.

14. A shock absorber as defined by claim 10, in which the diameter of the first control edge (48) and of the second edge (49) is greater than the diameter of the piston rod (4).

15. A shock absorber as defined by claim 1, in which an extension of said individual protrusions varies in an actuation direction of said control slide.

16. A shock absorber as defined by claim 16, in which at least one protrusion of at least one edge has the form of a tooth (53) and at least one indentation has the form of a tooth gap (52).

17. A shock absorber as defined by claim 1, in which at least one protrusion of at least one edge has the form of a tooth (53) and at least one indentation has the form of a tooth gap (52).

18. A shock absorber as defined by claim 1, in which edges forming respective throttle cross sections are embodied such that a damping force is variable linearly with a stroke of said control slide (33) at least in a portion of the stroke.

19. A shock absorber as defined by claim 1, in which said first slide control edge (48) determines a throttle cross section and extends uninterruptedly in at least some positions of said control slide.

20. A shock absorber as defined by claim 1, in which a throttle cross section in at least some positions of said control slide is formed by a cohesive, uninterrupted throttle cross section surface.

21. A shock absorber as defined by claim 1, in which a deflection (111) is provided in a control chamber (45), opposite the face end (46) of the control slide (33).

22. A shock absorber as defined by claim 1, in which a portion of the damping fluid being exchanged between the work chambers is throttled only once in a given flow direction by the throttle cross section.

23. A shock absorber as defined by claim 1, in which the total quantity of damping fluid flowing back and forth between the work chambers flows via said at least one flow connection.

24. A shock absorber as defined by claim 1, in which said adjusting device is effective coaxially to the shock absorber axis.

25. A shock absorber as defined by claim 26, in which said armature (25) is slidably mounted on said piston rod (4).

26. A shock absorber as defined by claim 1, which includes a transducer (51) which detects a position of a movable component that determines the throttle cross section (50) relative to said piston (5).

27. A shock absorber as defined by claim 26, in which said movable component that determines the throttle cross section (50) is the armature (25).

28. A shock absorber as set forth in claim 26 which includes a movable partition in one of said two work chambers.

29. A shock absorber as set forth in claim 1 which includes a movable partition in one of said two work chambers.

* * * * *